United States Patent
Florkey et al.

(10) Patent No.: US 7,130,619 B2
(45) Date of Patent: Oct. 31, 2006

(54) MOBILE-ORIGINATED RECONNECTION OF DROPPED WIRELESS CALLS

(75) Inventors: Cynthia Florkey, Chicago, IL (US); Ruth Schaefer Gayde, Naperville, IL (US); Victoria Marie Halsell, Aurora, IL (US); Karla Rae Hunter, Naperville, IL (US); E-Ling Lou, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 226 days.

(21) Appl. No.: 10/761,067

(22) Filed: Jan. 20, 2004

(65) Prior Publication Data
US 2005/0159138 A1    Jul. 21, 2005

(51) Int. Cl.
*H04Q 7/20* (2006.01)

(52) U.S. Cl. .......... 455/414.1; 455/450; 455/417; 455/445

(58) Field of Classification Search .......... 455/414.1, 455/432.3, 403, 415, 416, 417, 450, 452.1, 455/567, 412.1, 412.2, 436; 370/310, 329, 370/335, 328, 331
See application file for complete search history.

(56) References Cited

U.S. PATENT DOCUMENTS

| | | | | |
|---|---|---|---|---|
| 5,802,472 A | * | 9/1998 | Taniguchi | 455/445 |
| 6,032,040 A | * | 2/2000 | Choy et al. | 455/414.1 |
| 6,058,320 A | * | 5/2000 | Yokota | 455/574 |
| 6,246,872 B1 | * | 6/2001 | Lee et al. | 455/414.1 |
| 6,445,918 B1 | * | 9/2002 | Hellander | 455/423 |
| 6,633,760 B1 | * | 10/2003 | Ham et al. | 455/422.1 |
| 6,721,572 B1 | * | 4/2004 | Smith et al. | 455/456.1 |
| 6,810,263 B1 | * | 10/2004 | Cheng et al. | 455/510 |
| 6,990,349 B1 | * | 1/2006 | Idrissi | 455/450 |
| 2002/0068586 A1 | * | 6/2002 | Chun et al. | 455/458 |
| 2002/0090947 A1 | * | 7/2002 | Brooks et al. | 455/436 |
| 2004/0063471 A1 | * | 4/2004 | Kindo et al. | 455/566 |
| 2004/0203918 A1 | * | 10/2004 | Moriguchi et al. | 455/456.1 |
| 2004/0235509 A1 | * | 11/2004 | Burritt et al. | 455/519 |
| 2005/0054339 A1 | * | 3/2005 | Merritt | 455/423 |
| 2005/0070286 A1 | * | 3/2005 | Awasthi et al. | 455/436 |

* cited by examiner

*Primary Examiner*—Jean Gelin
(74) *Attorney, Agent, or Firm*—Steven R. Santema

(57) ABSTRACT

Conditional reconnection of a suspended call occurs responsive to a mobile unit (108) sending a mobile-originated reconnect (MORC) message into the network (102). Reconnection does not occur not if the mobile unit does not send a MORC message or affirmatively declines reconnection within a designated waiting period.

6 Claims, 4 Drawing Sheets

MOBILE-ORIGINATED RECONNECTION OF DROPPED WIRELESS CALLS

CROSS REFERENCE TO RELATED APPLICATIONS

This application is related to application Ser. No. 10/761,068, titled "Reconnection of Wireless Calls to Mobile Units in Border Cells," filed concurrently with the present application, assigned to the assignee of the present invention and incorporated herein by reference in us entirety.

FIELD OF THE INVENTION

This invention relates generally to wireless communication systems, and, more particularly, to methods for reconnecting calls following service interruptions in a wireless communication system.

BACKGROUND OF THE INVENTION

Wireless communication systems are well known in which mobile units can initiate or receive calls while roaming between different radio frequency (RF) coverage areas (sometimes referred to as "cells"). The mobile units communicate via RF resources with base stations distributed among the cells, which base stations are controlled by one or more mobile switching centers (MSCs). The MSCs provide control signaling for the call and connect the mobile unit to other participating endpoints, which may comprise other mobile units or wireline units.

Occasionally, mobile units can encounter service interruption(s) during a call, for example, upon entering a tunnel or reaching a fringe RF coverage area or due to a handoff error, causing the mobile unit to become dropped (at least temporarily) from the call. In such case, the MSC may attempt to page the mobile unit in attempt to find its location, reconnect the mobile unit and preserve the call. However, such network-initiated reconnects can be wasteful in terms of network resources and bandwidth, most particularly when there are multiple dropped calls and hence multiple pages flooding the network. The net effect of unsuccessful reconnection is a decreased revenue stream for the service provider.

A related problem with network-initiated reconnects is that they are performed (or not) without user input from the suspended mobile unit and the user is not informed whether a reconnect is or will be performed. Indeed, the user may not even know when RF coverage is lost because even though the mobile unit may display indicia of lost RF signal, the display might not be readily observed by the user while engaged in the call. Further, once the user believes the call is dropped, the user may reattempt the call, creating even further network traffic as the network will treat the call as a new communication session independent of the session that the network may be attempting to reconnect.

Accordingly, there is a need for a mobile-originated reconnect feature whereby a user may affirmatively request or decline a reconnect attempt rather than rely on a network-initiated reconnect that may or may not occur. Advantageously, the mobile-originated reconnect will be performed without network-initiated pages, thereby minimizing or at least reducing utilization of network resources and bandwidth; the mobile-originated reconnect will be recognized by the network as associated with a suspended (or reconnecting) call state, rather than a new call; and the mobile-originated reconnect will provide for better-informing the user of the reconnect status and RF signal status relative to the prior art. The present invention is directed to addressing these needs.

SUMMARY OF THE INVENTION

This need is answered and a technical advance is achieved in the art by a feature whereby a mobile unit may initiate reconnection of an interrupted call by sending a mobile-originated reconnect (MORC) message into the network; or conversely, the mobile unit may affirmatively decline a reconnect attempt by choosing not to send a MORC message (or alternatively, by sending a reconnect decline message) within a designated waiting period. Responsive to the MORC message (or absence of MORC message), the network will conditionally attempt (or not attempt) to reconnect the call. In such manner, the present invention provides for a mobile unit affirmatively requesting or declining a reconnect attempt of a call, rather than rely on network-initiated reconnect that may or may not occur; and for the network to reconnect a call without network-initiated pages.

In one embodiment, there is provided a method for conditionally reconnecting a call to a mobile unit responsive to a MORC message. When a service interruption is detected to the mobile unit, yielding a suspended call, a serving MSC monitors for a MORC message issued from the mobile unit. If a MORC message is received before expiration of a waiting period, the MSC reconnects the mobile unit to the suspended call, yielding a connected call. The MSC ends the call if a MORC message is not received or if a reconnect decline message is received before expiration of the waiting period. In one embodiment, a database of session information associated with a plurality of suspended calls is maintained; and reconnecting the mobile unit comprises retrieving session information associated with the mobile unit, yielding retrieved information, and reconnecting the mobile unit to one or more participating units identified in the retrieved information.

In another embodiment, there is provided a method performed by a mobile unit to conditionally reconnect to a suspended call. The mobile unit issues a MORC message defining a request for reconnection to the suspended call. The MORC message may be issued automatically or responsive to user input. Following the MORC message, if the suspended call is reconnected before expiration of a waiting period, the call is resumed; otherwise the call is ended.

In yet another embodiment, there is provided a method performed by a mobile unit responsive to service interruption in a call. The mobile unit prompts the user to select a reconnect option. The reconnect option(s) may be prompted by audio signal(s) and/or a display. The reconnect options may comprise, for example, a mobile-originated reconnect (MORC) option and reconnect decline option. The mobile unit detects user selection of a reconnect option, defining a user-selected option. The mobile unit then sends a message informing a serving mobile switching center (MSC) of the user-selected option, as appropriate.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
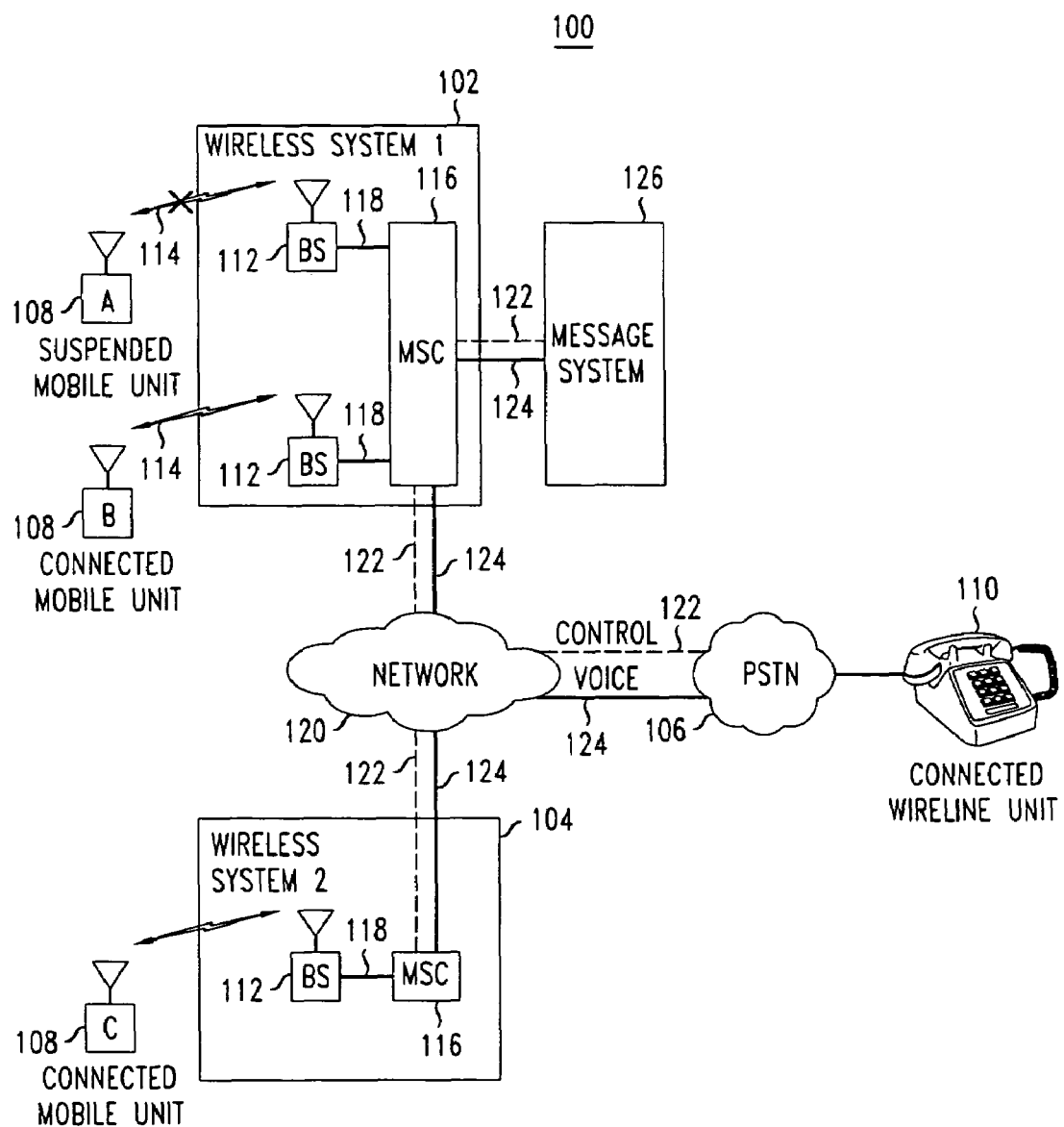
FIG. 1 is a block diagram of a communication system according to an exemplary embodiment of the present invention, illustrating a wireless mobile unit with dropped RF coverage.

FIG. 1 shows by way of example and not limitation, a wireless communication system 100 comprising a plurality of wireless subsystems 102, 104 ("Wireless System 1" and "Wireless System 2") interconnected to each other and to the public switched telephone network (PSTN) 106 by a network 120. The wireless subsystems 102, 104 may comprise public or private systems, or a combination thereof. As will be appreciated, although the wireless subsystems 102, 104 are shown as separate subsystems connected by a network 120, these systems may, in fact, be connected by a direct facility or integrated into a single wireless system connected to the PSTN 106. The network 120 may be implemented using any appropriate transmission, switching and routing technologies, as are known in the art, including but not limited to Internet Protocol (IP) and Asynchronous Transfer Mode (ATM) technologies.

Distributed among the wireless subsystems 102, 104 is a plurality of mobile units 108 (denoted "A," "B" and "C") and attached to the PSTN is a wireline unit 110 ("D"). The mobile units 108 comprise wireless devices that may include, but are not limited to, cell phones, two-way radios, laptop computers, personal digital assistants (PDAs) and the like having varying capacities to transmit information, such as voice, video, text or data traffic ("payload information") or control signaling ("control information") associated with communication service(s). The wireline unit 110 comprises generally any telephony device attached to the PSTN that is operable to exchange payload or control information associated with selected service(s) with the mobile units or with other wireline devices. The communication services may comprise, for example, wireline or wireless telephone service, electronic mail, facsimile service, paging service, short message service, electronic commerce, location service and/or packet data service.

The mobile units 108, generally, are adapted to roam between different RF coverage areas, sometimes referred to as "cells" (not shown) served by base stations 112. Each subsystem 102, 104 may include multiple base stations 112 serving multiple cells. The mobile units 108 communicate with the base stations 112 via RF resources 114 which may comprise narrowband frequency modulated channels, wideband modulated signals, broadband modulated signals, time division modulated slots, carrier frequencies, frequency pairs or generally any medium for communicating control or payload information to and from the mobile units. The RF resources may implement air interface technologies including but not limited to, CDMA, TDMA, GSM, UMTS or IEEE 802.11.

Wireless calls between and among the mobile units 108 and/or wireline units 110 are controlled by one or more telecommunication switching systems, exchanges or the equivalent, hereinafter termed mobile switching centers (MSCs) 116. The MSC(s) 116 may comprise, for example, AUTOPLEX™ switching systems, available from Lucent Technologies, Inc. As shown, separate MSCs 116 are contained within each of the subsystems 102, 104. As will be appreciated, however, a single MSC may control both subsystems (or a single, integrated system). The MSCs 116 include respective memory and processors (not shown), for storing and executing software routines for processing and switching calls, for providing various call features to calling parties and for providing access to the network 120 and PSTN 106. The MSCs 116 may be configured for operation with generally any suitable circuit, cell, or packet switching technology.

The MSCs 116 are connected to the base stations 112 by links 118, which may comprise, without limitation, Asynchronous Transfer Mode (ATM) links, ISDN lines, Ethernet LAN, wireless links, and the like. Links 122, 124 carry control and payload information, respectively, via network 120, between different MSCs 116, between MSC(s) and the PSTN 106 and, as shown, between the MSC of Wireless System 1 and a messaging system 126, such as a voice mail system. Although the links 122, 124 are shown as separate physical links carrying control and payload information, these links may be integrated into a single link carrying both control and payload information.

As shown, the payload information 124 comprises voice information. Alternatively or additionally, the payload information 124 may comprise information associated with video, data, text or generally any communication media. The messaging system 126 is not limited to a voice mail system but rather may comprise generally any appropriate system for wireless or wireline units to leave messages with other wireless or wireline units. The links 122, 124 are logical links that may be physically realized, without limitation, by conventional subscriber lines, ATM links, ISDN lines, WAN links, wireless links, and the like.

In the exemplary embodiment of FIG. 1, it is presumed that the MSC(s) 116 had established a call between mobile unit A and one or more participating units B, C and D and, sometime during the call, service became interrupted to mobile unit A. (Hence, the "X" drawn through the RF channel 114 serving mobile unit A.) This might occur, for example, upon mobile unit A entering a tunnel or reaching a fringe RF coverage area. As will be described in greater detail in relation to FIGS. 3 and 4, the present invention provides a method for mobile unit A to originate reconnection of the call (i.e., to regain communication with units B, C and D), rather than relying on network-initiated reconnection that may or may not occur. In one embodiment, the mobile-originated reconnection provides the user an affirmative choice to attempt reconnection (or not). If a reconnection attempt is requested, the user knows to wait a period of time for the reconnection attempt to proceed before re-attempting a second call; if a reconnection attempt is not requested, the user may elect to place a second call substantially any time after declining the reconnection attempt. The second call may be to the same parties or different parties as the original call.

Figure 2:
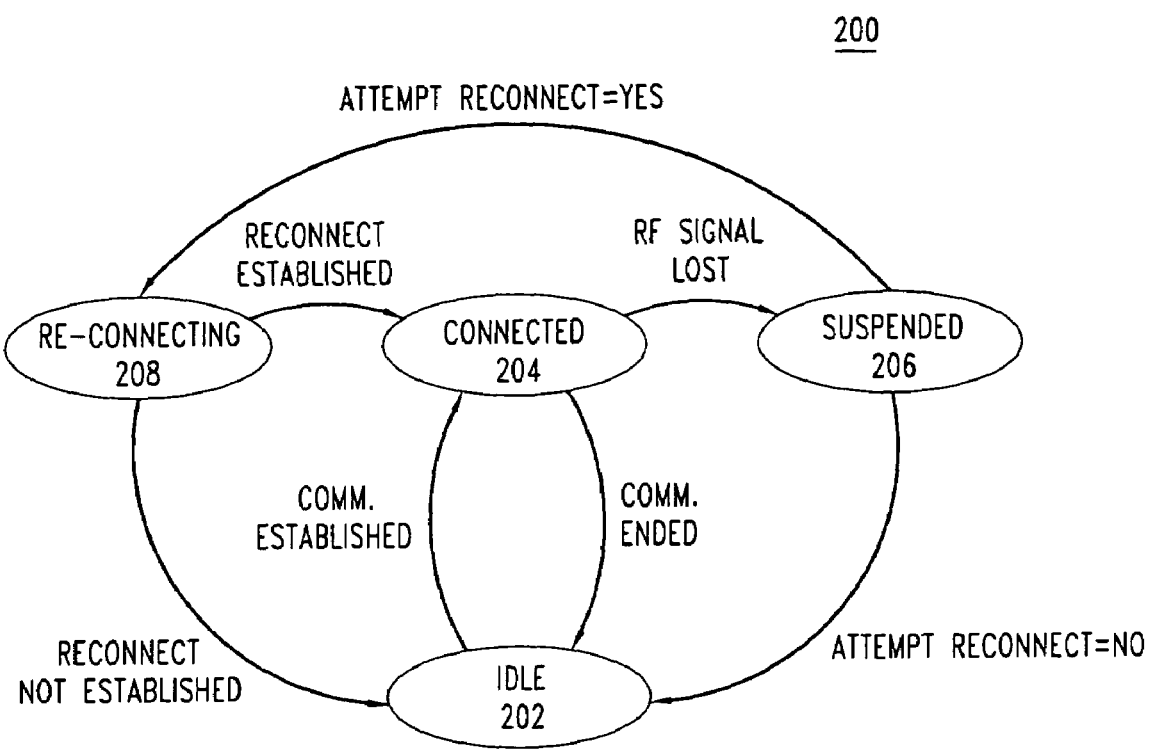
FIG. 2 is a state diagram illustrating various call states supported by a communication system of the type shown in FIG. 1 according to an embodiment of the present invention.

FIG. 2 is a state diagram 200 illustrating various call states supported by a communication system of the type shown in FIG. 1. The call states include an IDLE state 202, CONNECTED state 204, SUSPENDED state 206 and RECONNECTING state 208. Each mobile unit having registered with an MSC occupies one of the call states, but the mobile units may occupy different call states at different times. In one embodiment, each individual mobile unit keeps track of its present call state; and the respective call states of one or more mobile units are also tracked by serving MSCs (i.e., the MSCs serving the respective locations of the mobile units). In one embodiment, state machines and/or memory residing within the mobile units and MSCs record the various call states. Alternatively or additionally, state machines and/or memory recording call states of the mobile units may reside in separate network elements in communication with the MSCs.

Generally, a mobile unit is in the IDLE state 202 when it is not presently engaged in a call involving other mobile units or wireline units. That is, a mobile unit in the IDLE state does not presently require a bearer channel (e.g., voice channel) to support a call. Nevertheless, in the IDLE state, the mobile unit may communicate control messages with a serving MSC for mobility management purposes and the like.

A mobile unit enters the CONNECTED state 204 from the IDLE state 202 when it initiates or receives a call and a bearer channel is established to support the call. The mobile unit remains in the CONNECTED state for so long as it continues to participate in the call. If the mobile unit voluntarily ends its participation in the call, the call state moves from the CONNECTED to the IDLE state. If the bearer channel to the mobile unit is interrupted during the call (as would occur, for example, if the mobile unit loses RF coverage), the call state moves from the CONNECTED to the SUSPENDED state 206.

While in the SUSPENDED state, the mobile unit has lost (at least temporarily) the ability to participate in the call, but other end parties may still have bearer channels connected to the call (i.e., remaining in the CONNECTED state). For convenience, the term "suspended session" will refer to a communication with at least one party in the SUSPENDED state. According to an embodiment of the present invention, information identifying suspended session(s) is maintained by MSCs (or network elements in communication with the MSCs) and the connected legs of the session(s) are maintained, at least temporarily, to allow for possible reconnection of the SUSPENDED mobile units to the call(s). According to principles of the present invention, a user of a mobile unit in the SUSPENDED state may affirmatively choose to originate a reconnect attempt. Alternatively, the network may initiate a reconnect attempt. In either case, the call state moves from the SUSPENDED state to the RECONNECTING state 208. If the user declines to originate a reconnect (and the network does not initiate a reconnect), the call state returns to the IDLE state 202.

When in the RECONNECTING state, an attempt is made to reconnect the mobile to the suspended session. The reconnect attempt may occur responsive to a mobile-originated reconnect or network-initiated reconnect. If the reconnect is established, the call state returns to the CONNECTED state and the call may resume with the original parties. If the reconnect is not established within a designated time period, the call state returns to the IDLE state.

Figure 3:
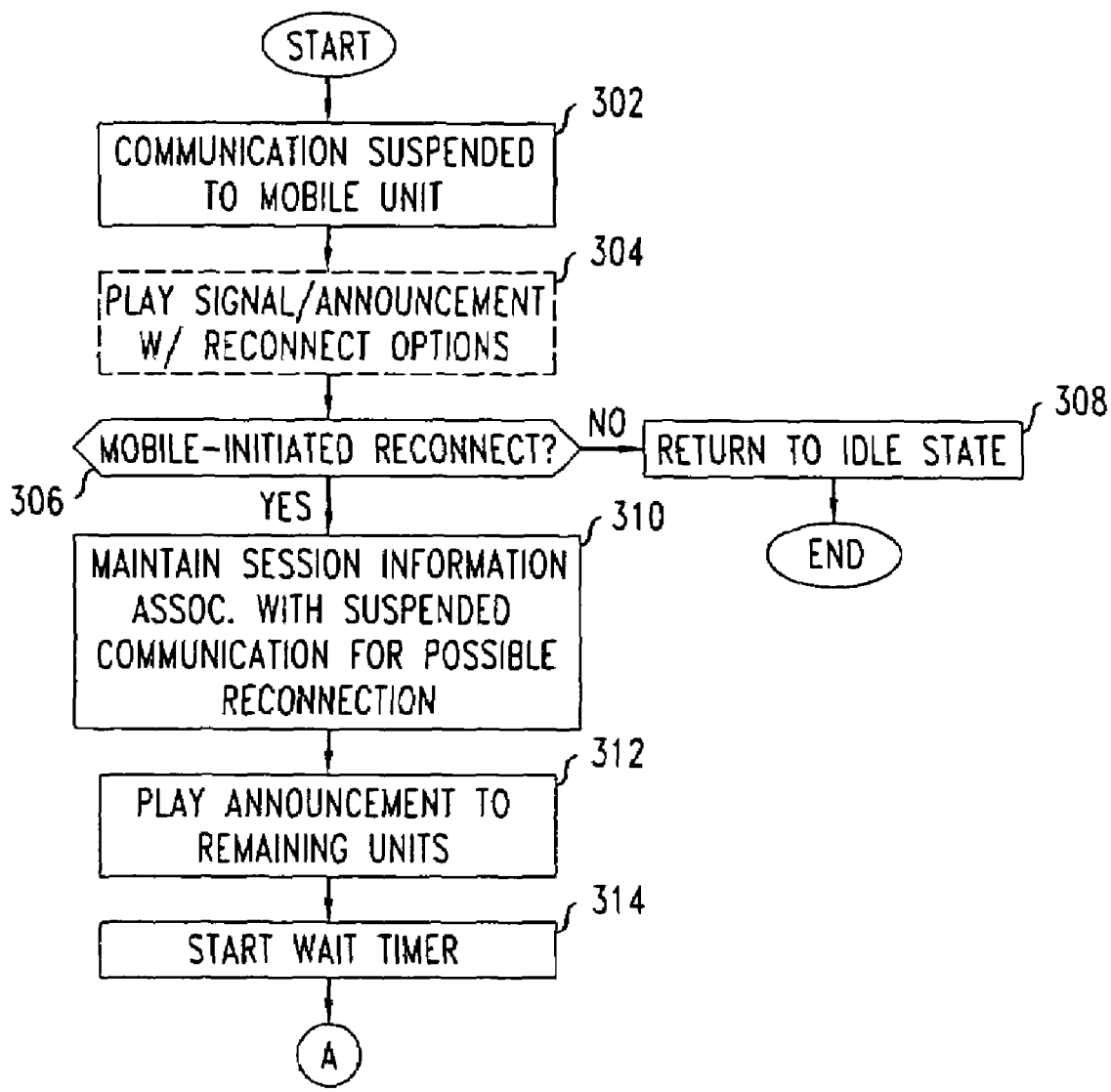
FIG. 3 is a flowchart showing a method for use in conjunction with a communication system of the type shown in FIG. 1, for processing a call when communication is suspended to the wireless mobile unit.

FIG. 3 is a flowchart showing a method for processing a suspended communication session (i.e., where at least one party is in a SUSPENDED call state). The steps of FIG. 3 are implemented, where applicable, using stored software routines within suspended the mobile unit, the MSCs 116 and/or messaging system 126.

At step 302, communication is suspended to a mobile unit (as may occur, for example, responsive to RF channel interruption during a call). Typically, a base station of the cell/sector in which the mobile unit is registered makes the determination that communication is suspended, initially, and reports the incident to the MSC. For example, with reference to FIG. 1, suppose mobile units A, B and C are engaged in a call and then mobile unit A enters a poor coverage area. The base station 108 formerly in communication with mobile unit A detects that RF signals from the mobile unit are below an acceptable threshold and reports the incident to the MSC. Generally, unless the MSC knows that the mobile unit has roamed to and registered with a new cell/sector, the MSC will determine from the report of weak signals that service has been interrupted to the mobile unit and accordingly, will change the state of the mobile unit from the CONNECTED state to the SUSPENDED state. The mobile unit itself changes from the CONNECTED state to the SUSPENDED state when it fails to receive RF signals from a base station or when it receives RF signals that are below an acceptable threshold.

For purposes of example, it is presumed the remaining steps of FIG. 3 are executed while the RF channel remains interrupted. As will be appreciated, however, alternative implementations are possible wherein some of the steps of FIG. 3 are implemented after the RF channel is reacquired. In either case, the steps of FIG. 3 are performed with the mobile unit in the SUSPENDED state.

Optionally, at step 304, the mobile unit provides an indication, audible tone or announcement informing the user that the RF signal is lost and informs the user of available reconnect options. Advantageously, the indication of lost RF signal is provided supplementary to (or instead of) a display to facilitate quicker recognition than would be provided by a display alone. In one embodiment, the available reconnect options are provided by a display. In the preferred embodiment, the available reconnect options include a mobile-originated reconnect (MORC) option that is affirmatively selectable (or declinable) by the user. Step 304 is indicated as optional because a user may be aware of the reconnect options without relying on a signal or announcement. Further, in one embodiment, the MORC option may be provisioned to occur automatically responsive to suspension of the mobile unit and in such case, a signal or announcement is not required. Still further, recall that the steps of FIG. 3 are performed while the RF channel is interrupted and the mobile unit is not in communication with the MSC. Hence, notification of options to the mobile unit in the SUSPENDED state may be deferred until RF communication is reestablished to the mobile unit. In such case, the notification of options may be implemented by the MSC or messaging system sending a signal/message to the mobile unit.

At block 306, a determination is made whether the user has selected or declined the MORC option. In one embodiment, the determination is made responsive to the user a pressing a particular key, entering a code, executing a voice command or the like instructing the mobile unit to accept or decline the MORC option. Alternatively, the MORC option may be accepted or declined automatically according to predefined user or factory settings stored within the mobile unit. If the user declines the MORC option, the mobile unit returns to the IDLE state at step 308. If the user accepts the MORC option, the mobile unit moves to the RECONNECTING state. It is noted, a determination that the MORC option is selected at block 306 does not mean that the MORC option is exercisable (yet)—the MORC option is not exercisable until RF communication is reestablished to the mobile unit as will be described in relation to FIG. 4. Indeed, user acceptance or declining of the MORC option will not be communicated to the serving MSC until after RF signal is reacquired—until such time, the MSC will consider the mobile unit in the SUSPENDED state.

At step 310, the network/MSC maintains or obtains session information associated with the suspended communication to allow for possible reconnection. It is contemplated that the network will maintain a database including session information for a plurality of suspended communications. The session information may include, for example, indicia of participating parties and their call states (e.g., indicia of the SUSPENDED party and any remaining CONNECTED parties of each session), indicia of network resources presently used and/or required for the session(s) and indicia of the session(s) themselves (e.g., reference number, time-stamp or the like) to support possible reconnection with SUSPENDED party(s). It is noted, the maintenance of session information at step 310 may be commenced at any time before, during or after interruption of service to the mobile unit.

At step 312, the network plays an announcement informing any remaining connected parties of the service interruption and inviting them to hold to await reconnection (e.g., "Please hold, the mobile subscriber is reconnecting to the network.") It is presumed for purposes of example that at least one participating unit will hold to await service recovery and reconnection to the suspended mobile unit.

At step 314, the MSC starts a wait timer to measure a period of time allowed for service recovery to the mobile unit. The mobile unit might also have a wait timer associated with the suspended connection (or alternatively, when the RF signal is reacquired, the MSC may download its timer value to the mobile unit). If the timer expires before reconnection, the connection to the remaining connected parties will be dropped. In one embodiment, the time period is relatively short (i.e., on the order of seconds) such that service will be re-established (or not) relatively quickly and the hold time of the remaining units will be reasonably short. The hold time may be predetermined or dynamically determined for different types or times of service outages.

Figure 4:
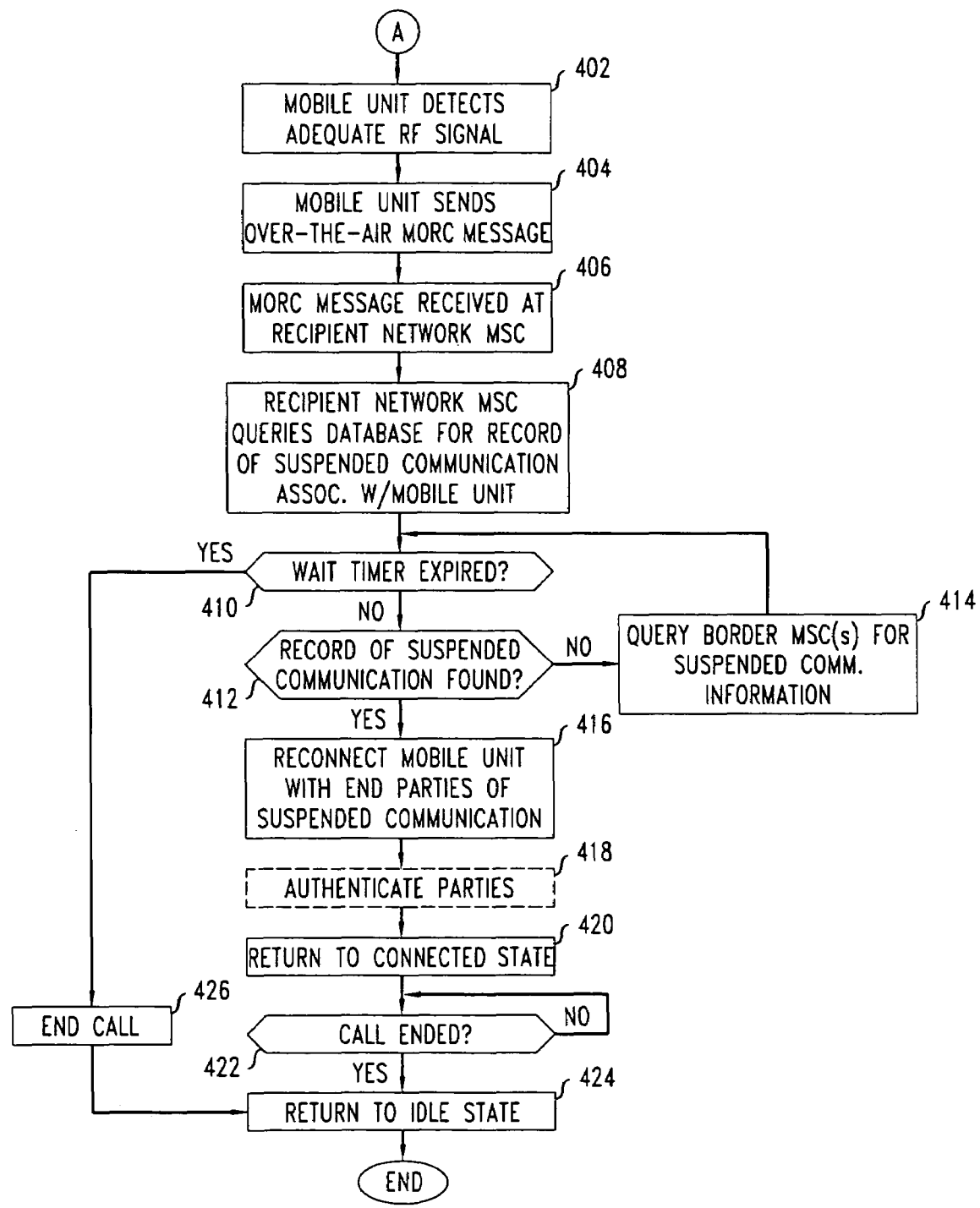
FIG. 4 is a flowchart showing a method for use in conjunction with a communication system of the type shown in FIG. 1, for performing a mobile-initiated reconnect after RF communication is reestablished with the wireless mobile unit.

FIG. 4 shows further steps for processing the suspended communication session after RF communication is reestablished with the suspended mobile unit. The steps of FIG. 4 are implemented, where applicable, using stored software routines within the suspended mobile unit, the MSCs 116 and/or messaging system 126.

At step 402, the mobile unit reacquires an adequate RF signal from a base station at its present location. The base station from which the adequate RF signal is received may be the same or different than the base station having last communicated with the mobile unit (i.e., before the service interruption).

At step 404, the mobile unit sends an over-the-air MORC message to the network. Generally, the MORC message includes information that will enable the network to reconnect the mobile unit to its last communication session (i.e., the suspended session). In one embodiment, the information includes indicia of the mobile unit (e.g., user device ID) and indicia of the last communication session (e.g., communication session ID). The last communication session may have been an originating or terminating session with respect to the mobile unit. Presuming the MORC message is received by a base station at the mobile unit's present location, the base station forwards the MORC message (or sends a separate message including MORC information) to its controlling MSC. The MSC receives the MORC information at step 406. For convenience, the term "recipient network MSC" refers to the MSC receiving the MORC message. The recipient network MSC may be the same or different than the serving MSC having controlled the call before the service interruption (and hence having information associated with the suspended call session).

At step 408, the recipient network MSC queries its database of suspended communication sessions (described in relation to FIG. 3, step 310) for a record of a suspended communication including the mobile unit. The particular suspended communication associated with the mobile unit may be found by matching up the mobile unit ID and/or the session ID received in the MORC information with the corresponding information in the database.

If the wait timer has not yet expired, determined at step 410, and a record of the suspended communication is found, determined at step 412, the MSC at step 416 reconnects the mobile unit with the end parties of the suspended communication and the parties can resume communications. Optionally, at step 418, an authentication may be performed between the mobile unit and the network to ensure that the right parties are connected. This could involve exchange of additional information over the air interface. The state of the mobile unit is changed from RECONNECTING to CONNECTED at step 420. The call continues with the mobile unit in the CONNECTED state until such time as the call ends, determined at step 422, and then the state of the mobile unit returns to the IDLE state at step 424.

If at step 410 the wait timer is expired, the call is ended at step 426 and the mobile unit returns to the IDLE state at step 424.

If at slep 412 a record of the suspended communication is not found, the recipient MSC at step 414 queries border MSC(s) for a record of the suspended communication. For example, the recipient network MSC may not have a record of the suspended communication if the mobile unit roamed into the coverage area of the recipient MSC during the service interruption but a different MSC controlled the call before the service interruption. In such case, the recipient MSC queries its border MSC(s) at step 414 in attempt to find the MSC that originally controlled the call (and hence, to find a record of the suspended communication) to support reconnection of the call. Generally, if a record of suspended communication is retrieved from a border MSC before the wait timer is expired, the recipient MSC may use the information obtained from the record at step 416 to support reconnection of the mobile unit. The feature of reconnecting calls to mobile units having roamed between different MSCs during the call suspension is the subject of related application Ser. No. 10/761,068.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a wireless communication system wherein a call is established between a mobile unit and one or more participating units, the communication system maintaining a database of session information associated with a plurality of suspended calls, the session information including indicia of one or more participating units for each of the suspended calls, and wherein a service interruption is detected to the mobile unit during the call, yielding a suspended call session, a method comprising:

monitoring for a reconnect message issued from the mobile unit, defining a mobile-originated reconnect (MORC) message, the MORC message defining a request for reconnection to the suspended call session exclusive of a call origination; and if a MORC message is received before expiration of a waiting period, reconnecting the mobile unit to the suspended call session, yielding a connected call the step of reconnecting comprising:

retrieving session information associated with the suspended call session of the mobile unit, yielding retrieved information; and reconnecting the mobile unit to the one or more participating units identified in the retrieved information.

2. The method of claim 1, wherein the step of retrieving session information comprises:

obtaining, from the MORC message, a session identifier associated with the suspended call session of the mobile unit;

querying the database for session information corresponding to the session identifier; and if session information corresponding to the session identifier is found, retrieving the session information.

3. The method of claim 1, wherein the step of retrieving session information comprises:

obtaining, from the MORC message, a mobile unit identifier associated with the mobile unit;

querying the database for session information corresponding to the mobile unit identifier, and if session information corresponding to the mobile unit identifier is found, retrieving the session information.

4. The method of claim 1, further comprising authenticating the one or more participating units identified in the retrieved information.

5. In a wireless communication system wherein a call is established between a mobile unit and one or more participating units, the communication system maintaining call state information associated with the mobile unit, and wherein a service interruption is detected to the mobile unit during the call, yielding a suspended call session, a method comprising:

entering a suspended call state when service interruption is detected to the mobile unit;

with the mobile unit in the suspended call state, monitoring for a reconnect message issued from the mobile unit, defining a mobile-originated reconnect (MORC) message, the MORC message defining a request for reconnection to the suspended call session exclusive of a call origination; and if a MORC message is received before expiration of a waiting period, entering a reconnecting call state and reconnecting the mobile unit to the suspended call session, yielding a connected call; and entering a connected call state if the mobile unit is reconnected to the suspended call before expiration of the waiting period.

6. In a wireless communication system wherein a call is established between a mobile unit and one or more participating units, and wherein a service interruption is detected to the mobile unit during the call, yielding a suspended call session, the mobile unit maintaining call state information associated with the suspended call, a method comprising the mobile unit:

entering a suspended call state when service interruption is detected to the mobile unit;

with the mobile unit in the suspended call state, issuing a mobile-originated reconnect (MORC) message, the MORC message defining a request for reconnection to the suspended call session exclusive of a call origination;

entering a reconnecting call state after issuing the MORC message, to await possible reconnection of the call; and if the sa ended call is reconnected before expiration of a waiting period, entering a connected call state and resuming the call; otherwise entering an idle call state and ending the suspended call if the mobile unit is not reconnected to the suspended call before expiration of the waiting period.

* * * * *